2,515,565
Patented June 2, 1970

3,515,565
SELF-EXTINGUISHING CELLULOSE ACETATE COMPOSITIONS
Edwin Lee Wood and Roger E. Gibson, Kingsport, Tenn., assignors to Eastman Kodak Company, Rochester, N.Y., a corporation of New Jersey
No Drawing. Filed Oct. 3, 1967, Ser. No. 679,541
Int. Cl. C08b 27/58
U.S. Cl. 106—177  1 Claim

ABSTRACT OF THE DISCLOSURE

Cellulose acetate compositions self-extinguishing when subjected to the Underwriter's Laboratories burning test composed of 100 parts by weight cellulose acetate, about 36 to 59 parts by weight of plasticizer mixture which includes 32 to 53 parts by weight of at least one trialkylphosphate and about 5 to 10 parts by weight of an organic bromine compound having a bromine content of about 30% to 80% by weight.

---

This invention is directed to compositions of self-extinguishing cellulose acetate. More particularly, the present invention relates to cellulose acetate compositions which exhibit improved self-extinguishing properties and sufficient stability at high temperatures to permit molding without decomposition.

Cellulose acetate compositions plasticized with the usual cellulose acetate plasticizers such as, for instance, the lower alkylphthalates are not suitable for many applications requiring a high degree of flame resistance. In these instances attempts have been made to obtain cellulose acetate compositions by utilizing plasticizers such as tributyl phosphate, triphenyl phosphate, tricresyl phosphate and the like. Although these phosphates reduce the flammability somewhat the resulting compositions are not self-extinguishing to the degree that they pass the Underwriters' Laboratories Burning Test. Nor has the use of flameproofing agents such as bromine compounds offered a solution to this problem for the addition of these agents to cellulose acetate compositions has consistently failed to provide a satisfactory self-extinguishing material.

It is an object of the present invention, therefore, to provide cellulose acetate compositions which are sufficiently stable at high temperatures that can be molded into various objects and sheets and which possess self-extinguishing properties that enable them to pass the Underwriters' Laboratories Burning Test.

The improved self-extinguishing compositions of the invention comprise 100 parts by weight cellulose acetate, about 36 to 53 parts by weight of a plasticizer mixture which includes about 32 to 53 parts by weight of at least one trialkyl phosphate and about 5 to 10 parts by weight of an organic bromine compound having a bromine content of about 30 to 80% by weight.

Organic bromine compounds particularly suitable for use in the composition of the invention include bromine derivatives of phthalic anhydride such as tetrabromophthalic anhydride, ethyl hydrogen tetrabromophthalate, n-propyl hydrogen tetrabromophthalate, dibutyl bromophthalate, 2-bromoethyl hydrogen tetrabromophthalate, didodecyl tetrabromophthalate, butyl glycidyl tetrabromophthalate and the like; bromine derivatives of phenyl acetate such as 2,4,6-tribromophenyl acetate; bromine derivatives of pentaerythritol such as pentaerythritol dibromide; bromine derivatives of cyclic hydrocarbons such as hexabromocyclododecane and tetrabromocyclododecene and bromine derivatives of organic phosphates such as tris-(2,3-dibromopropyl) phosphate; bromine derivatives of phenols such as 2,4,6-tribromophenol and like organic bromine compounds which tend to split off hydrogen bromide. Particularly preferred organic bromine compounds are 2,4,6-tribromophenyl acetate, pentaerythritol dibromide or tris(2,3-dibromopropyl) phosphate since they provide clear or pastel cellulose acetate molded articles of manufacture.

The trialkyl phosphate component of the invention comprises at least one trialkyl phosphate wherein the alkyl substituents are generally of 1 to 20 carbon atoms, preferably lower alkyl say of 1 to 5 carbon atoms. Suitable trialkyl phosphates include trimethyl phosphate, triethyl phosphate, tripropyl phosphate, tributyl phosphate, triamyl phosphate, trihexyl phosphate, trioctyl phosphate, tridecyl phosphate, tridodecyl phosphate and the like. Advantageously, a mixture of trialkyl phosphates are employed preferably in a ratio of about 20 to 35 parts by weight of one trialkyl phosphate and about 12 to 18 parts by weight of a dissimilar trialkyl phosphate.

A minor proportion, generally about 4 to 6 parts by weight, of supplemental plasticizers are included in the plasticizer mixture. Suitable supplemental plasticizers include, by way of example, dimethyl phthalate, diethyl phthalate, methylphthalyl ethyl glycolate, glyceryl tripropionate and the like.

Cellulose acetates suitable for use in the present invention are thermoplastic and generally have a substitution equivalent of about 50% to 60% combined acetic acid and a viscosity characteristic of less than about 600 seconds, preferably less than 100 seconds.

The compositions of the invention may be thermally shaped or formed into articles or objects utilizing any of the well known molding processes of the art. For example, the compositions may be shaped into sheets, rods, tubes, bars and other articles such as toys, household articles and the like by, for instance, extrusion, injection molding, compression molding under heat and pressure and like molding processes.

The following examples are included to further illustrate the invention. As defined in the claims the Underwriters' Laboratories burning test employed is carried out as follows:

Specimens used are 6 inches in length by ½ inch in width in both $\frac{1}{16}$ inch and ¼ inch thickness. Two sets of specimens of each thickness, three specimens per set, are provided for each test. One set of each thickness is tested in the "as-received" condition; the other set is tested after being aged in an oven at 70° C. (158° F.) for a duration of 7 days, and then cooled in a desiccator, over calcium chloride, for at least 4 hours at room temperature.

The apparatus employed consists of a thermostatically-controlled electrically-heated oven, a desiccator containing calcium chloride, a Bunsen burner having a ⅜ inch diameter tube, a ring stand with clamp, a stop watch or other timing device, and a supply of untreated surgical cotton.

The burning test shall be conducted in a location that is free from drafts. The test specimen is supported from the upper end, with longest dimension vertical, by the clamp on the ring stand so that the lower end of the specimen is ⅜ inch above the top of the burner tube. The burner is then placed remote from the sample, ignited, and adjusted to produce a blue flame ¾ inch in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or flowing combustion of the specimen noted. If the specimen drips flaming particles or droplets while burning in this test, these drippings shall be allowed to fall onto a horizontal layer of cotton fibers (untreated surgical cotton) placed 1 foot below the test specimen. Significantly flaming particles are considered to be those capable of igniting the cotton fibers.

The duration of flaming or glowing combustion of vertical specimens after application of the test flame, average of three specimens (6 flame applications) shall not exceed 25 seconds (maximum not more than 30 seconds) and the portion of the specimen outside the clamp shall not be completely burned in the test. These requirements apply to the specimens tested both before and after aging in an oven at 70° C. (158° F.) for 7 days.

This invention will be further illustrated by the following examples of preferred embodiments, although it will be understood that these examples are included merely for purposes of illustration and are not intended to limit the scope of the invention.

EXAMPLE 1

One thousand grams of cellulose acetate, 240 grams triisobutyl phosphate, 120 grams triethyl phosphate, 40 grams diethyl phthalate, 75 grams 2,4,6-tribromophenyl acetate and small amounts of stabilizers and lubricants are mixed and worked on a hot roll. The resulting plastic is pelleted and molded into bars. These bars are self-extinguishing when subjected to the Underwriters' Laboratories burning test.

EXAMPLE 2

The process of Example 1 is repeated except 50 grams of tetrabromophthalic anhydride is used in place of the 2,4,6-tribromophenyl acetate. The resulting bars are also self-extinguishing when subjected to the Underwriters' Laboratories burning test.

EXAMPLE 3

One thousand grams of cellulose acetate, 306 grams triisobutyl phosphate, 155 grams triethyl phosphate, 50 grams diethyl phthalate, 75 grams pentaerythritol dibromide and suitable stabilizers and lubricants are mixed and worked on a hot roll. The resulting plastic after pelleting is molded to form bars. The bars are self-extinguishing by the Underwriters test.

EXAMPLE 4

One thousand grams of cellulose acetate, 306 grams triisobutyl phosphate, 155 grams tricesyl phosphate, 50 grams diethyl phthalate, 75 grams 2,4,6-tribromophenyl acetate and suitable stabilizers and lubricants are mixed and worked on a hot roll. The resulting plastic is granulated and pressed to form test bars. These bars are self-extinguishing when subjected to the Underwriters' Laboratories burning test.

The invention has been described in detail with particular reference to certain preferred embodiments thereof, but it will be understood that variations and modifications can be effected within the spirit and scope of the invention as described hereinabove and as defined in the appended claims.

We claim:

1. A cellulose acetate composition self-extinguishing when subjected to the Underwriters' Laboratories burning test and sufficiently stable at high temperatures to permit molding without decomposition, comprising proportionately 100 parts by weight cellulose acetate, about 36 to 59 parts by weight of a plasticizer mixture which includes about 32 to 53 parts by weight of at least one trialkyl phosphate wherein the alkyl group contains from 1 to 20 carbons, and about 5 to 10 parts by weight of 2,4,6-tribromophenyl acetate.

References Cited

UNITED STATES PATENTS

| | | |
|---|---|---|
| 1,985,771 | 12/1934 | Eichengrun. |
| 2,574,515 | 11/1951 | Walter et al. ____ 106—177 XR |
| 2,617,737 | 11/1952 | Stern _____ 106—177 |

FOREIGN PATENTS 958,120   5/1964   Great Britain.

JULIUS FROME, Primary Examiner

L. B. HAYES, Assistant Examiner

U.S. Cl. X.R.

106—15, 190, 196; 252—8.1